United States Patent [19]
Watanabe

[11] Patent Number: 5,396,121
[45] Date of Patent: Mar. 7, 1995

[54] SOLID-STATE IMAGING DEVICE AND A METHOD FOR DRIVING THE SAME

[75] Inventor: Takashi Watanabe, Soraku, Japan

[73] Assignee: Sharp Kabushiki Kaisha, Osaka, Japan

[21] Appl. No.: 139,552

[22] Filed: Oct. 20, 1993

[30] Foreign Application Priority Data

Oct. 21, 1992 [JP] Japan .................. 4-283296

[51] Int. Cl.⁶ .................. H03K 3/42; H01L 29/796; G11C 19/28; H04N 3/14
[52] U.S. Cl. .................. 327/515; 257/229; 257/232; 257/246; 377/58; 348/303; 348/322
[58] Field of Search .............. 257/222, 223, 229–234, 257/246; 377/58, 61; 358/213.22, 213.26; 307/311; 348/303, 321–324

[56] References Cited

U.S. PATENT DOCUMENTS

| | | | |
|---|---|---|---|
| 4,581,539 | 4/1986 | Kimata | 257/232 |
| 4,604,652 | 8/1986 | Elabd et al. | 257/246 |
| 4,675,887 | 6/1987 | Akiyama et al. | 377/58 |
| 4,752,829 | 6/1988 | Kim | 358/213.26 |
| 4,803,710 | 2/1989 | Elabd | 257/232 |
| 4,810,901 | 3/1989 | Yamada | 307/311 |
| 4,860,326 | 8/1989 | Mutoh | 377/58 |
| 4,862,487 | 8/1989 | Ando et al. | 257/232 |

FOREIGN PATENT DOCUMENTS 60-119182  6/1985  Japan .
60-183881  9/1985  Japan .

OTHER PUBLICATIONS

M. Kimata et al., "A 480×400 Element Image Sensor with a Charge Sweep Device", IEEE International Solid-State Circuits Conference, Feb. 13, 1985, pp. 100–101.

*Primary Examiner*—Gene M. Munson
*Attorney, Agent, or Firm*—David G. Conlin; Robert F. O'Connell; Kevin J. Fournier

[57] ABSTRACT

A method for driving a solid-state imaging device which includes the steps of (1) reading a signal from an i-th pixel in the pixel portion into a vertical charge transfer portion over k bit portions thereof starting from the i-th bit portion thereof; (2) transferring the read signal corresponding to k bits of the vertical charge transfer portion in the vertical direction during one horizontal blanking period; (3) reading a signal from an (i+1)-th pixel of the n pixels arranged in the pixel portion into the vertical charge transfer portion over k bit portions thereof starting from the (i+1)-th bit portion thereof after the completion of the transfer of signal portions corresponding to the (k−1) bits of the read signal corresponding to the k bits of the vertical charge transfer portion; (4) repeating the steps (1) through (3) for the pixels arranged in the pixel portion starting from the first pixel nearest to a horizontal charge transfer portion to a pixel farther therefrom; and (5) repeating the step (2) after an n-th pixel farthest from the horizontal charge transfer portion has been read.

6 Claims, 9 Drawing Sheets

SOLID-STATE IMAGING DEVICE AND A METHOD FOR DRIVING THE SAME

BACKGROUND OF THE INVENTION

1. Field of the Invention

The present invention relates to a solid-state imaging device including an array of pixels for conducting the photoelectric transfer and charge accumulation, and employing a CCD (charge-coupled device), and a method for driving the solid-state imaging device. More particularly, the present invention relates to a solid-state imaging device in which the maximum charge handling capacity is significantly increased.

2. Description of the Related Art

Various types of two-dimensional solid-state imaging devices are known. Among them, a charge-coupled device (CCD) type solid-state imaging device has an advantage that it generates less noise. In general, the CCD type solid-state imaging device is classified into two groups: one group relates to an interline transfer system, and the other group relates to a frame transfer system. At the present time, the CCD type solid-state imaging device of the interline transfer system is most commonly used. This is because such a CCD type solid-state imaging device has practical advantages that it is highly sensitive to short wavelengths, and that it generates less false signals called "smears", and that it can be made small in size.

Figures 5A, 5B:
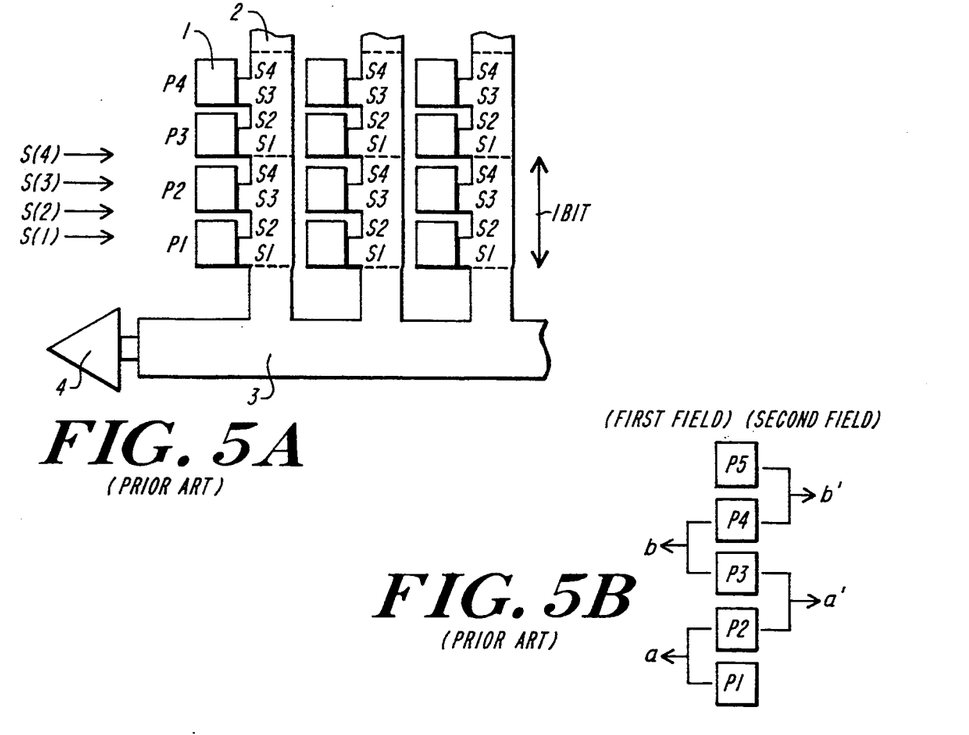
FIGS. 5A and 5B are schematic views of the structure of a conventional solid-state imaging device.

FIG. 5A schematically shows the structure of a conventional CCD type solid-state imaging device of an interline transfer system. Such a CCD type solid-state imaging device includes a plurality of photosensitive elements (pixels) 1 for converting light into electric charge and accumulating the electric charge. The plurality of pixels 1 are arranged in an array of rows and columns along a first direction (hereinafter, referred to as a vertical direction) and a second direction (hereinafter, referred to as a horizontal direction) which is substantially perpendicular to the first direction. The CCD type solid-state imaging device further includes vertical charge transfer portions 2 each disposed on the adjacent right side of each column of pixels 1 for vertically transferring signals read from the pixels 1, a horizontal charge transfer portion 3 connected to end of each of the vertical charge transfer portions 2 for horizontally transferring the signals supplied from the vertical charge transfer portions 2, and an output portion 4 disposed at one end of the horizontal charge transfer portion 3 for converting the signals supplied from the horizontal charge transfer portion 3 into image signals to output them to an external device.

Each of the vertical charge transfer portions 2 has a four-phase structure. Specifically, each of the vertical charge transfer portions 2 is driven by four-phase driving signals S(1), S(2), S(3), and S(4) which are supplied from an external device. A pair of pixels which are adjacent to each other in the vertical direction correspond to one bit of each of the vertical charge transfer portions 2. For example, the pixels P1 and P2, P3 and P4 correspond to one bit thereof, respectively.

As shown in FIG. 5B, the conventional CCD type solid-state imaging device effects field accumulation and interlaced reading. Specifically, in a first (odd-number) field, signals output from the pixels P1 and P2 which are adjacent to each other in the vertical direction are handled as one packet signal a, while in a second (even-number) field, signals output from the pixels P2 and P3 which are adjacent to each other in the vertical direction are handled as one packet signal a'. Then, in the first field, signals output from the pixels P3 and P4 which are adjacent to each other in the vertical direction are handled as one packet signal b, while in the second field, signals output from the pixels P4 and P5 which are adjacent to each other in the vertical direction are handled as one packet signal b'.

Figure 6:
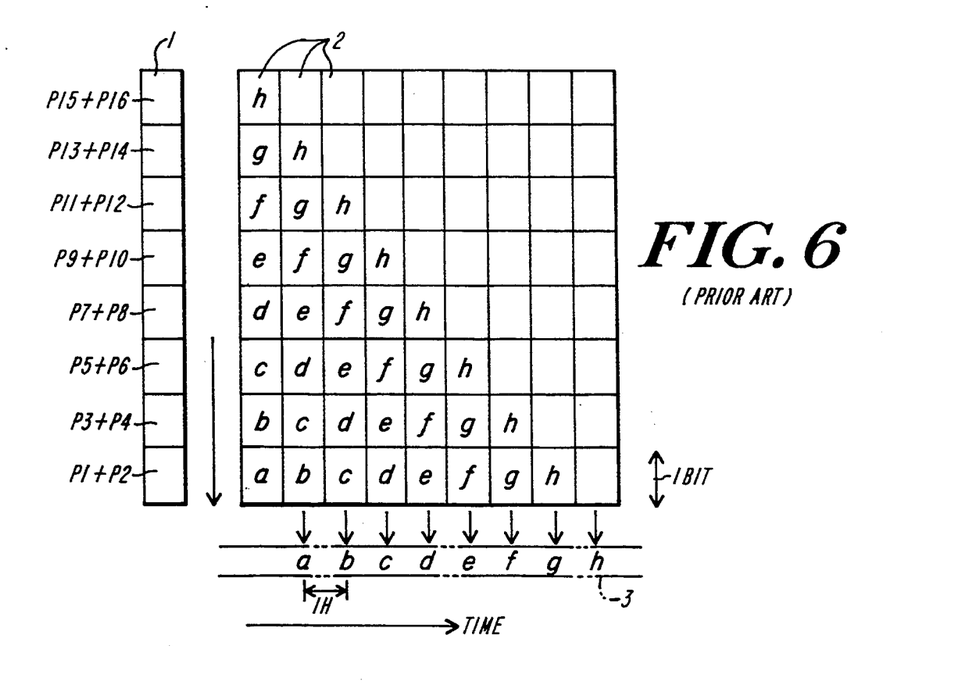
FIG. 6 is a schematic view illustrating the read and transfer operation carried out by the conventional solid-state imaging device.

FIG. 6 schematically illustrates a conventional signal processing method used for the CCD type solid-state imaging device mentioned above. In this schematic view, the signal processing for only the first field is shown. The left part of FIG. 6 shows pairs of pixels P1 and P2, P3 and P4, . . . , P15 and P16 arranged in one column along the vertical direction, which respectively output packet signals a, b, . . . , h. The right part of FIG. 6 shows an arrangement of the packet signals a, b, . . . , h in one of the vertical charge transfer portions 2 in the time sequence.

Figure 7:
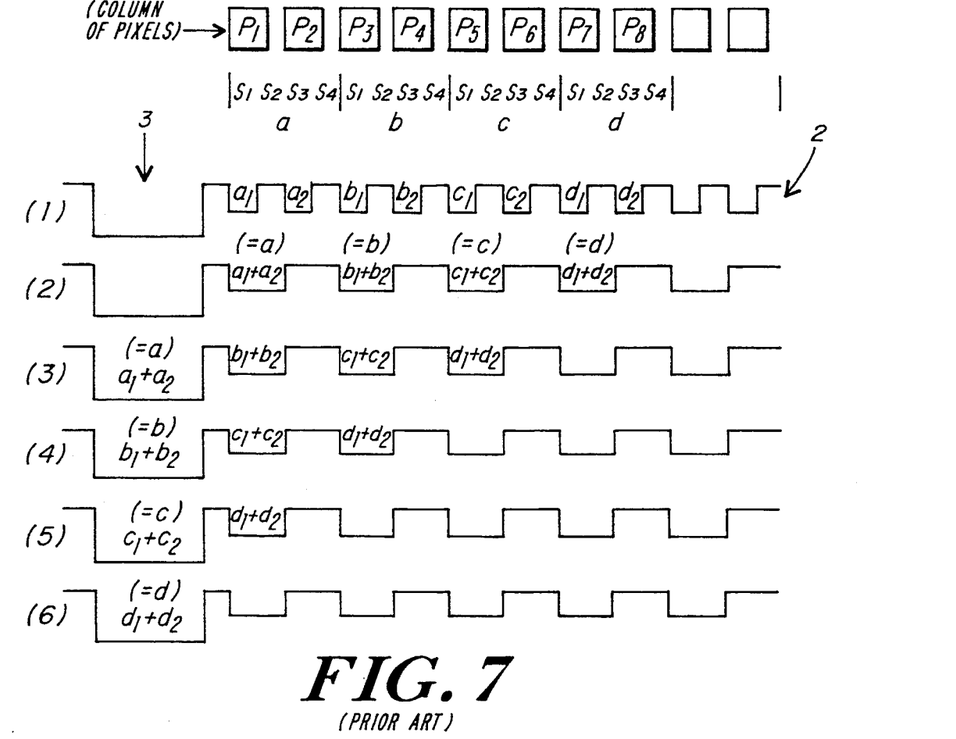
FIG. 7 is a potential distribution illustrating the signal transfer in a vertical charge transfer portion of the conventional solid-state imaging device.

FIG. 7 shows a potential distribution of the electrodes of one of the vertical charge transfer portions 2 in time sequence in order to illustrate the signal transfer in the vertical charge transfer portion 2.

Referring to FIG. 7, in stage (1), all of the signals a1, a2, b1, b2, . . . formed in the pixels P1, P2, P3, P4, . . . in one column are simultaneously read into the vertical charge transfer portion 2. Then, in stage (2), each two signals a1 and a2, b1 and b2, . . . read from the pairs of pixels P1 and P2, P3 and P4, . . . are added together to obtain signals (a1+a2), (b1+b2), . . . which corresponds to one bit of the vertical charge transfer portion 2, respectively.

In stage (3) and as shown in FIG. 6, all the signals present in the vertical charge transfer portion 2 are vertically shifted by one bit, so that the signal (a1+a2), i.e., a first packet signal a is transferred into the horizontal charge transfer portion 3. Hereinafter, a packet signal is referred to as a signal read from a unit of pixels, for example, a pair of pixels P1 and P2. The transferred packet signal a is then horizontally transmitted in the horizontal charge transfer portion 3 at high speed to reach the output portion 4, where it is converted into an image signal and is output to an external device.

After the first packet signal a is processed as described above, in stage (4), a signal (b1+b2) corresponding to the next single bit of the vertical charge transfer portion 2, i.e., a second packet signal b is transferred into the horizontal charge transfer portion 3. The transferred packet signal b is then horizontally transmitted in the horizontal charge transfer portion 3 at high speed to reach the output portion 4, where it is converted into an image signal and is output to an external device.

A third packet signal c (stage (5)), a fourth packet signal d (stage (6)), and other subsequent packet signals are also processed as described above. The horizontal charge transfer portion 3 transmits each signal corresponding to one bit of the vertical charge transfer portion 2 to the output portion at high speed whenever it receives the signal. The output portion 4 then converts the signal into an image signal and outputs it into an external device.

Thus, as shown in FIG. 6, the packet signals each corresponding to a single bit of the vertical charge transfer portion 2 are transferred one by one into the horizontal charge transfer portion 3 during the respective horizontal scanning periods 1H, and then are output from the output portion 4.

According to the conventional CCD type solid-state imaging device mentioned above, one packet signal corresponds to only one bit of the vertical charge transfer portion 2. This means that the maximum charge handling capacity which the vertical charge transfer portion 2 can handle is limited to the capacity available for one bit thereof. Since a dynamic range of such a solid-state imaging device depends on the maximum in charge handling capacity, the dynamic range of the solid-state imaging device is limited when the maximum charge handling capacity is limited to a certain capacity. This may result in causing a problem when it is desirable to provide a small-sized solid-state imaging device.

Figure 8A:
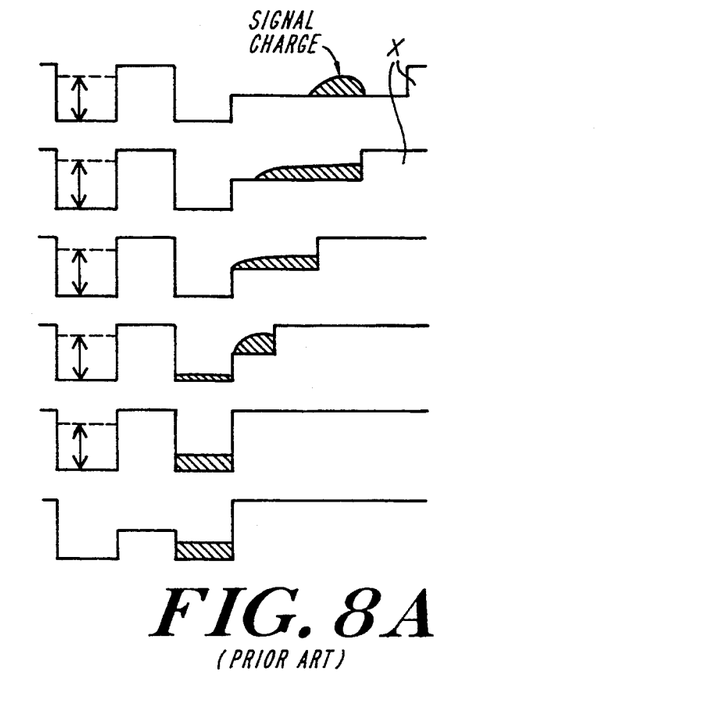
FIGS. 8A and 8B are potential distributions in shift registers of other conventional solid-state imaging devices.
Figure 8B:
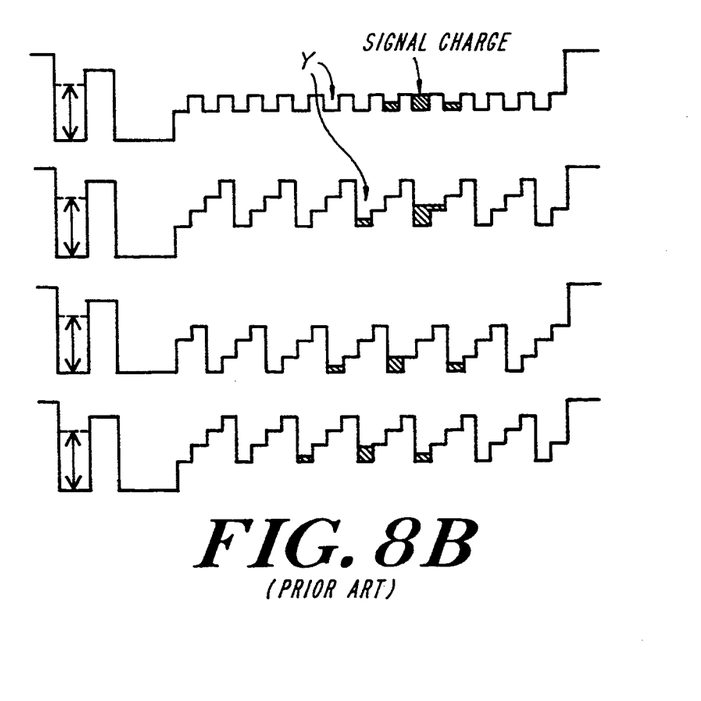

To solve such a problem, two types of transfer methods are disclosed in Japanese Laid-Open Patent Publication No. 60-119182 (FIG. 8A) and Japanese Laid-Open Patent Publication No. 60-183881 (FIG. 8B), respectively. These methods, both called a charge sweep method, include the steps of reading one packet signal, spreading it over a vertical charge transfer portion, and collecting a charge of the signal into a storage portion which is provided at one end of the vertical charge transfer portion during one horizontal transfer period. Regarding how to collect the charge of the signal into the storage portion, one method shown in FIG. 8A includes the steps of gradually enlarging a potential barrier X. The other method shown in FIG. 8B includes the step of splitting the charge of the signal into a plurality of wells Y and transferring it a plurality of times.

According to the transfer methods mentioned above, the a charge handling capacity corresponding to one image signal capable of being handled by the vertical charge transfer portion greatly increases. However, the following problems arise: the operation of collecting the charge of the signal which is read from pixels to the vertical charge transfer portion into one end of the vertical charge transfer portion is carried out during a time period when the horizontal charge transfer portion is operating to transfer the charge of the signal to an output portion, that is, an image signal is being output. As a result, driving pulse signals for driving the vertical charge transfer portion may be intruded into the image signal, resulting in generating noise. Further, since the charge of the signal is collected from the entire portion of the vertical charge transfer portion into the storage portion provided at one end thereof, the number of driving pulse signals required for the operation of this collection increases, resulting in an increase in power consumption.

SUMMARY OF THE INVENTION

The present invention provides a method for driving a solid-state imaging device including: a pixel portion including n pixels arranged in a first direction, the pixels converting light into electric charge and accumulating electric charge; first charge transfer portion coupled to the pixel portion, for transferring a signal read from each of the pixels arranged in the pixel portion in the first direction; second charge transfer portion coupled to one end of the first charge transfer portion, for receiving the signal transferred by the first charge transfer portion and for transferring the received signal in a second direction; and output portion coupled to one end of the second charge transfer portion for receiving the signal transferred by the second charge transfer portion and for converting the received signal into an image signal to output to an external device, the method including the steps of: (1) reading a signal from an i-th pixel of the n pixels arranged in the pixel portion into the first charge transfer portion over k bit portions thereof starting from the i-th bit portion thereof; (2) transferring the read signal corresponding to k bits of the first charge transfer portion in the first direction during one horizontal blanking period; (3) reading a signal from an (i+1)-th pixel of the n pixels arranged in the pixel portion into the-first charge transfer portion over k bit portions thereof starting from the (i+1)-th bit portion thereof after the completion of the transfer of signal portions corresponding to the (k−1) bits of the read signal corresponding to the k bits of the first charge transfer portion; (4) repeating the steps (1) through (3) for the pixels arranged in the pixel portion starting from the first pixel nearest to the second charge transfer portion to a pixel farther therefrom; and (5) repeating the step (2) after an n-th pixel farthest from the second charge transfer portion has been read.

In one embodiment of the invention, the transferring step (2) includes the steps of splitting the signal corresponding to the k bits of the first charge transfer portion into first signal portions corresponding to (k−1) bits and second signal portions corresponding to l bits, and transferring the first signal portions and the second signal portions in the first direction during one horizontal blanking period, where l is an integer satisfying $1 \leq l < k$.

In another embodiment of the invention, the pixel has a first pixel portion and a second pixel portion, and the signal is a sum of a signal from the first pixel portion and a signal from the second pixel portion.

According to another aspect of the present invention, the solid-state imaging device includes: a pixel portion including n pixels arranged in a first direction, the pixels converting light into electric charge and accumulating electric charge; first charge transfer portion coupled to the pixel portion, for transferring a signal read from each of the pixels arranged in the pixel portion in the first direction; second charge transfer portion coupled to one end of the first charge transfer portion, for receiving the signal transferred by the first charge transfer portion and for transferring the received signal in a second direction; output portion coupled to one end of the second charge transfer portion for receiving the signal transferred by the second charge transfer portion and for converting the received signal into an image signal to output to an external device; and driving circuit for driving the first charge transfer portion, wherein the driving circuit generates a plurality of driving signals for: (1) reading a signal from an i-th pixel of the n pixels arranged in the pixel portion into the first charge transfer portion over k bit portions thereof starting from the i-th bit portion thereof; (2) transferring the read signal corresponding to k bits of the first charge transfer portion in the first direction during one horizontal blanking period; (3) reading a signal from an (i+1)-th pixel of the n pixels arranged in the pixel portion into the first charge transfer portion over k bit portions thereof starting from the (i+1)-th bit portion thereof after the completion of the transfer of signal portions corresponding to the (k−1) bits of the read signal corresponding to the k bits of the first charge transfer portion; (4) repeating the steps (1) through (3) for the pixels arranged in the pixel portion starting from the first pixel nearest to the second charge transfer portion to a pixel farther therefrom; and (5) repeating the step (2) after an n-th pixel farthest from the second charge transfer portion has been read.

In one embodiment of the invention, the signal corresponding to k bits of the first charge transfer portion in the step (2) is split into first signal portions corresponding to (k−1) bits and second signal portions corresponding to 1 bits, and the first signal portions and the second signal portions are transferred in the first direction during one horizontal blanking period, where 1 is and integer satisfying $1 \leq l < k$.

In another embodiment of the invention, each of the pixels has a first pixel portion and a second pixel portion, and the signal is a sum of a signal from the first pixel portion and a signal from the second pixel portion.

According to the present invention, one packet signal is read over k bit portions of the vertical charge transfer portion. With this structure, the maximum charge handling capacity of the vertical charge transfer portion can be increased by k times.

Furthermore, according to the present invention, the vertical charge transfer portion reads a signal as one packet signal from pixel(s) and puts the signal into k bit portions of the vertical transfer portion. The signal corresponding to the k bit portions is referred to as a k bit signal. After a (k−1) bit signal of the k bit signal is transferred, a next packet signal from pixel(s) is read and put into another k bit portions of the vertical charge transfer portion. The k bit portions of the next packet signal are shifted to a farther position from the horizontal charge transfer portion in the vertical direction by one bit portion from the k bit portions of the previous packet signal. Therefore, the signal read into the vertical charge transfer portion are always lined up in the vertical charge transfer portion without posing any inbetween blank bit portion. This allows an efficient use of the vertical charge transfer portion. In the vertical charge transfer portion, the signal transfer operation is carried out only during the horizontal blanking periods. Therefore, driving pulse signals can be applied to electrodes of the vertical charge transfer portion only during the horizontal blanking periods. Thus, troubles of an increase in power consumption and noise generation in output signals can be prevented.

Thus, the invention described herein makes possible the advantages of (1) providing a solid-state imaging device in which size reduction and increase in the number of pixels with high density are possible, and (2) providing a solid-state imaging device in which troubles of increase in power consumption and intrusion of clock noise into an output signal can be prevented.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the attached drawings as follows:

EXAMPLE 1

Figure 3A:
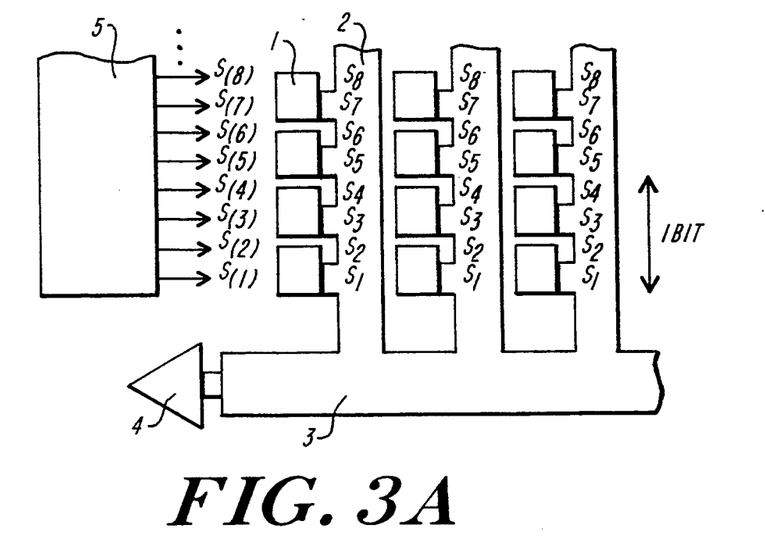
FIGS. 3A and 3B are schematic views of the structure of the solid-state imaging device according to the present invention.

FIG. 3A schematically shows the structure of a solid-state imaging device of the present invention. The solid-state imaging device includes a plurality of pixels 1 for conducting light into electric charge and accumulating the electric charge in an array of rows and columns along a first direction (hereinafter, referred to as a vertical direction) and a second direction (hereinafter, referred to as a horizontal direction) which is substantially perpendicular to the first direction. The solid-state imaging device further includes vertical charge transfer portions 2 each disposed at an adjacent portion of each column of pixels 1 for transferring signals read from the pixels 1 in the vertical direction, a horizontal charge transfer portion 3 connected to one end of each of the vertical charge transfer portions 2 for transferring the signals supplied from the vertical charge transfer portions 2, an output portion 4 connected to one end of the horizontal charge transfer portion 3 for converting the signals supplied from the horizontal charge transfer portion 3 into image signals to output them to an external device, and a driving circuit 5.

The vertical charge transfer portions 2 have four-phase structures. Specifically, four electrodes are provided as a group corresponding to one bit transfer in the vertical charge transfer portion 2. The driving circuit 5 generates driving signals S(1), S(2), S(3), S(4), S(5), ... which are different from one other, and applies the driving signals to the electrodes of the vertical charge transfer portion 2, respectively. The driving signals S(1), S(2), S(3), S(4), S(5), ... are used for reading the signals in the pixels 1 to the vertical charge transfer portion 2 and shifting them vertically in the vertical charge transfer portion 2. We will describe below what kinds of driving signals are generated and how they are applied to the electrodes of the vertical charge transfer portion 2.

Figure 3B:
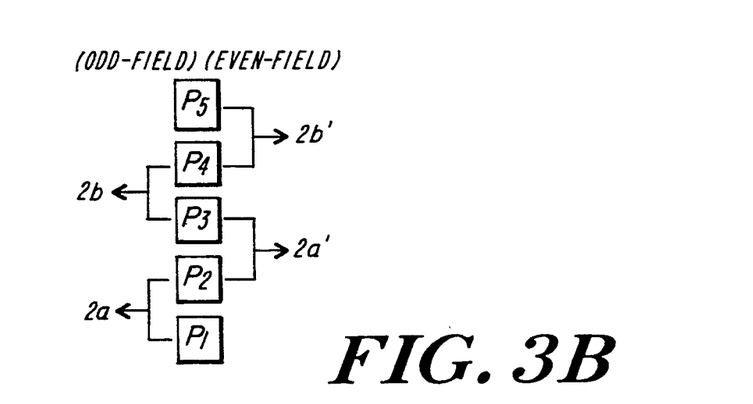

As shown in FIG. 3B, the solid-state imaging device of this example effects field accumulation and interlaced reading. In a first (odd-number) field, signals output from the pixels P1 and P2 which are adjacent to each other in the vertical direction are handled as one packet signal 2a, while in a second (even-number) field, signals output from the pixels P2 and P3 which are adjacent to each other in the vertical direction are handled as one packet signal 2a'. Then, in the first field, signals output from the pixels P3 and P4 which are adjacent to each other in the vertical direction are handled as one packet signal 2b, while in the second field, signals output from the pixels P4 and P5 which are adjacent to each other in the vertical direction are handled as one packet signal 2b'. The reading mode is not limited to a mode in an above-mentioned manner. Other reading modes can also be applicable to the present invention. For example, an ordinary skilled person would understand the present invention is applicable in a case where a signal output from each of the pixels P1, P2, P3, P4, . . . is individually handled as one packet signal.

Figure 1:
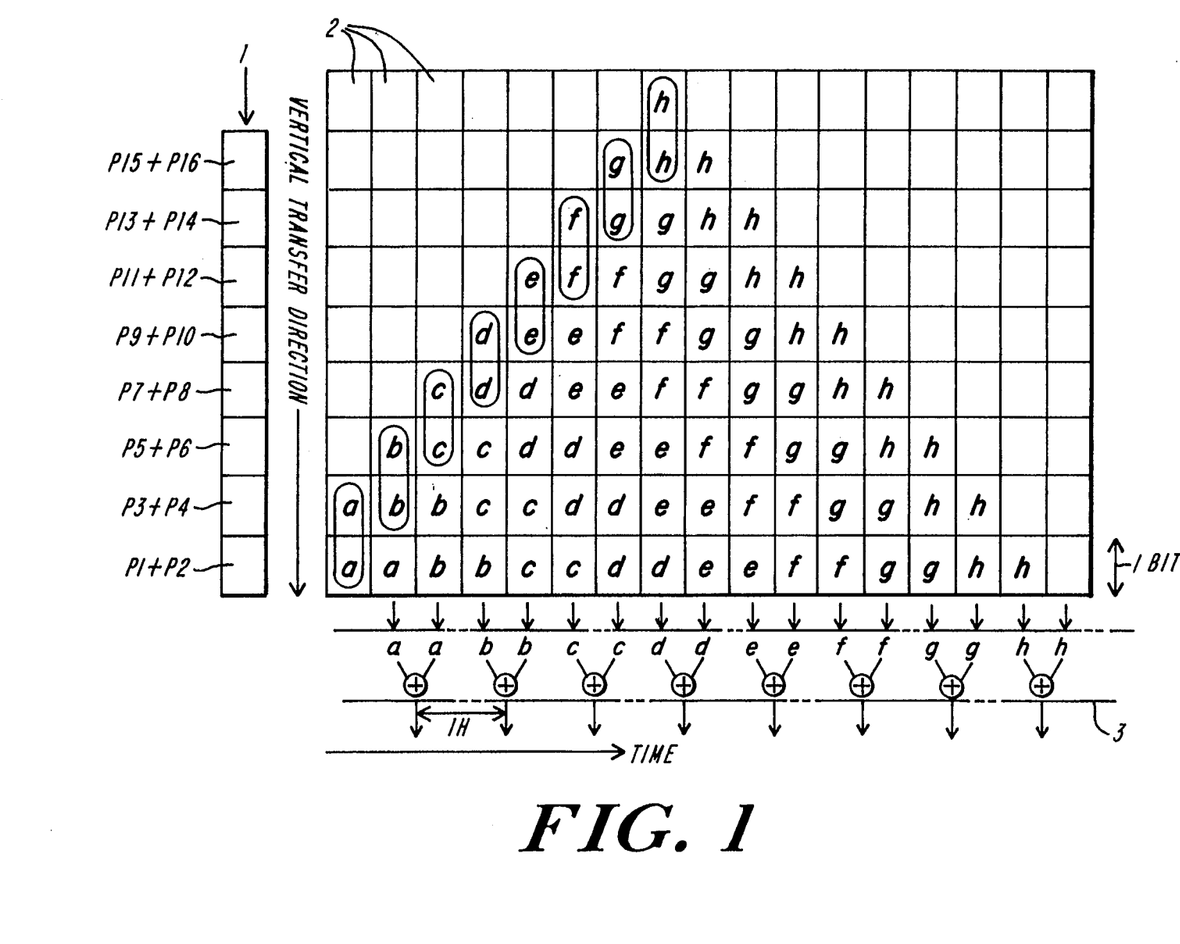
FIG. 1 is a schematic view illustrating the read and transfer operation carried out in a solid-state imaging device according to the present invention.

FIG. 1 schematically illustrates an exemplified signal read and transfer operation used for the solid-state imaging device of this example. In this schematic view, the signal read operation for only the first field is shown. The left part of FIG. 1 shows pairs of pixels P1 and P2, P3 and P4, . . . , P15 and P16 in one column of pixels 1, which respectively output packet signals a, b, . . . , h. Instead of reading signals from each pair of the pixels as one packet signal, it is possible to read a signal from each pixel individually as one packet signal. The right part of FIG. 1 shows an arrangement of the packet signals a, b, . . . , h in one vertical charge transfer portion 2, in the time sequence.

Figure 2:
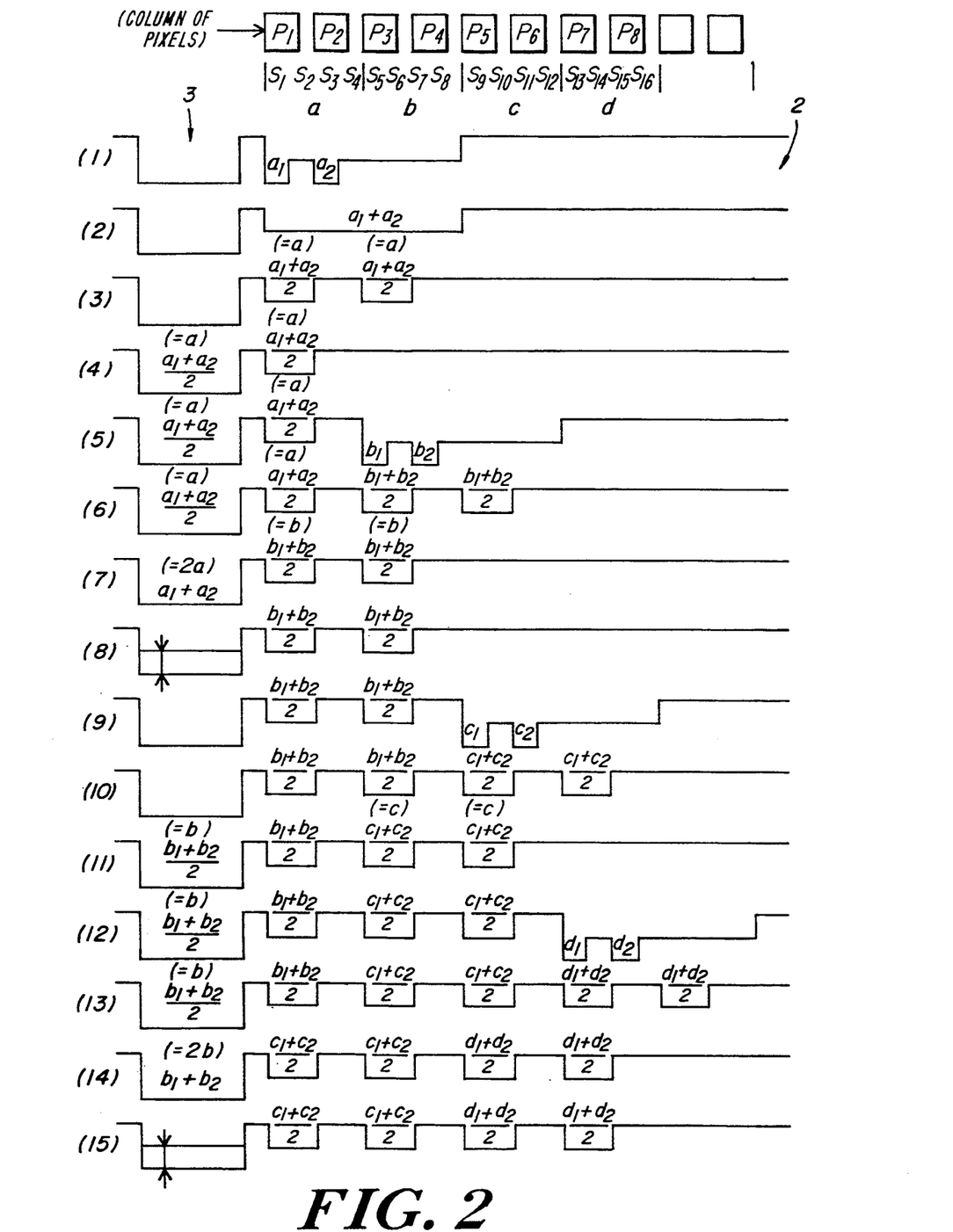
FIG. 2 is a potential distribution illustrating the signal transfer in a vertical charge transfer portion of the solid-state imaging device according to the present invention.

FIG. 2 shows a potential distribution of the electrodes of the vertical charge transfer portion 2 in time sequence in order to illustrate the signal transfer in the vertical charge transfer portion 2.

Referring to FIGS. 1 and 2, how the signals are read as one packet signal into the vertical charge transfer portion 2, and how the read signals are transferred to the horizontal charge transfer portion 3 will be described in detail below. In stage (1) of FIG. 2, signals a1 and a2 formed in the pair of pixels P1 and P2 are first read into the vertical charge transfer portion 2. Then, in stage (2), the signals a1 and a2 are added to each other over two bit portions of the vertical charge transfer portion 2 to obtain a signal a1+a2 (i.e., 2a). Then, in stage (3), the signal a1+a2 is split into two (a1+a2)/2 (i.e., a) signals. More specifically, the first packet signal 2a which corresponds to a first image signal is read from a first pixel unit, for example, a pair of pixels P1 and P2, and is put into two bit portions of the vertical charge transfer portion 2 (see FIG. 1). Hereinafter, a signal corresponding to the k bit portions of the vertical charge transfer portion 2 is referred to as a k bit signal.

In stage (4), all the signals present in the vertical charge transfer portion 2 are shifted in the vertical direction by one bit, so that a first one bit signal a is transferred into the horizontal charge transfer portion 3.

Then, in stage (5), the next signals b1 and b2 are read from the next pair of pixels P3 and P4. In stage (6), the signals b1 and b2 are added to each other over the two bit portions of the vertical charge transfer portion 2 to obtain a signal b1+b2 (i.e., 2b), and then the signal b1+b2 is split into two (b1+b2)/2 (i.e., b) signals. More specifically, the second packet signal 2b is read from a second pixel unit, for example, a pair of pixels P3 and P4, and is put into other two bit portions of the vertical charge transfer portion 2 (see FIG. 1). The two bit portions of the second packet signal are shifted to a farther position from the horizontal charge transfer portion 3 in the vertical direction by one bit portion from the two bit portions of the first packet signal.

In stage (7), all the signals present in the vertical charge transfer portion 2 are shifted in the vertical direction by one bit, so that a second one bit signal a is transferred into the horizontal charge transfer portion 3. This one bit signal a and the previously-transferred one bit signal a are added to each other in the horizontal charge transfer portion 3 to obtain a signal (a1+a2) corresponding to one image signal. The process including stages (1) through (7) for obtaining the signal (a1+a2) corresponding to one image signal is carried out during one horizontal blanking period.

Thereafter, in stage (8), the signal (a1+a2) is transferred in the horizontal direction by the horizontal charge transfer portion 3 during the horizontal transfer period at high speed to reach the output portion 4, where it is converted into an output signal.

The above-described signal read and transfer operation is repeated for packet signals 2b, 2c, . . . 2h, in the same manner as shown in stages (9) through (15) during the respective horizontal scanning periods 1H until the packet signal 2h is read from a farthest pixel unit from the horizontal charge transfer portion 3, for example, a pair of pixels P15 and P16, and is put into other two bit portions of the vertical charge transfer portion 2 as a signal (h,h). As a result, each of the signals corresponding to one packet signal is transferred by the horizontal charge transfer portion 3 to the output portion 4 with an interval of the horizontal scanning period 1H.

Thereafter, only the signal transfer operation is carried out in the vertical charge transfer portion 2. The signals e and e, f and f, g and g, and h and h read over the two bit portions of the vertical charge transfer portion are transferred one by one into the horizontal charge transfer portion 3 as shown in FIG. 1. In the horizontal charge transfer portion 3, they are added to each other to obtain signals (e+e), (f+f), (g+g), and (h+h) and then are transferred to the output portion 4.

When the signal read and transfer operation for the first field is completed, the signal read and transfer operation for the second field of the same column of pixels immediately starts in the same manner as that described above.

According to the solid-state imaging device of this example, one packet signal is read over the two bit portions of the vertical charge transfer portion 2. Therefore, the maximum charge handling capacity of the vertical charge transfer portion 2 can be doubled.

Further, after one bit signal of the two bit signal is shifted in the vertical charge transfer portion 2, a next packet signal is read over another two bit portions of the vertical charge transfer portion 2. The two bit portions of the next packet signal are shifted to a farther position from the horizontal charge transfer portion 3 in the vertical direction by one bit portion from the two bit portions of the first packet signal. Therefore, the signal read into the vertical charge transfer portion 2 is always lined up in the vertical charge transfer portion 2 without posing any inbetween blank bit portion. This allows an efficient use of the vertical charge transfer portion 2. In the vertical charge transfer portion, the signal transfer operation is carried out only during the horizontal blanking periods. Therefore, driving signals can be applied only during the horizontal blanking periods. Thus, troubles of increase in power consumption and noise generation in output signals can be prevented.

Figure 9:
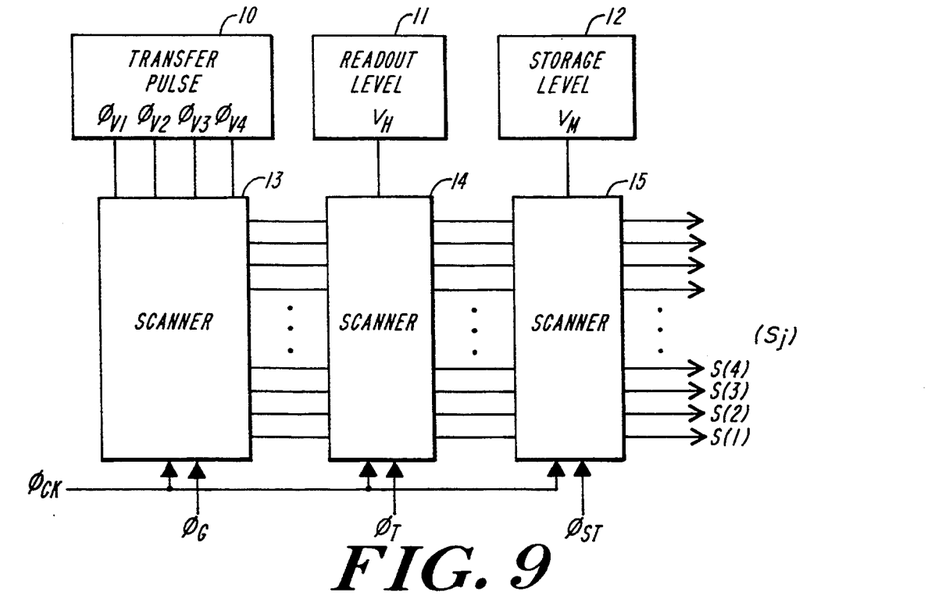
FIG. 9 is a circuit configuration of a driving circuit of a solid-state imaging device according to the present invention.

FIG. 9 shows an example of a circuit configuration for the driving circuit 5. A transfer pulse generating portion 10 generates pulse signals $\phi_{V1}$, $\phi_{V2}$, $\phi_{V3}$, and $\phi_{V4}$. These pulse signals are supplied to a scanner 13. A readout level supply portion 11 supplies a voltage signal $V_H$ indicating a readout level to a scanner 14. A storage level supply portion 12 supplies a voltage signal $V_M$ indicating a storage level to a scanner 15. The scanner 13 receives a pulse signal $\phi_G$, the scanner 14 receives a pulse signal $\phi_T$, and the scanner 15 receives a pulse signal $\phi_{ST}$. The scanners 13, 14, and 15 also receive a clock signal $\phi_{CK}$ for synchronization. The scanners generate respective signals in accordance with a prescribed logic as will be described later in detail. As a result, the driving signals S(1), S(2), S(3), . . . are generated, which are then applied to the electrodes of the vertical charge transfer portion 2.

Figure 10:
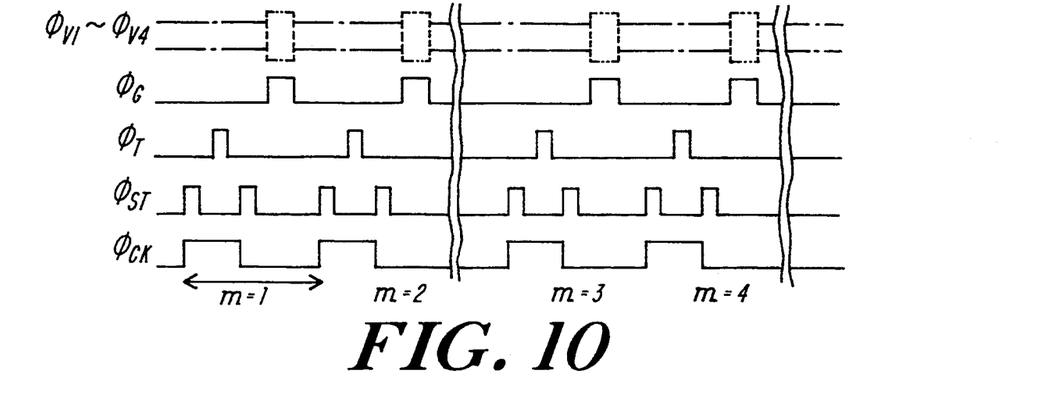
FIG. 10 shows waveforms of pulse signals used for the solid-state imaging device according to the present invention.
Figure 11:
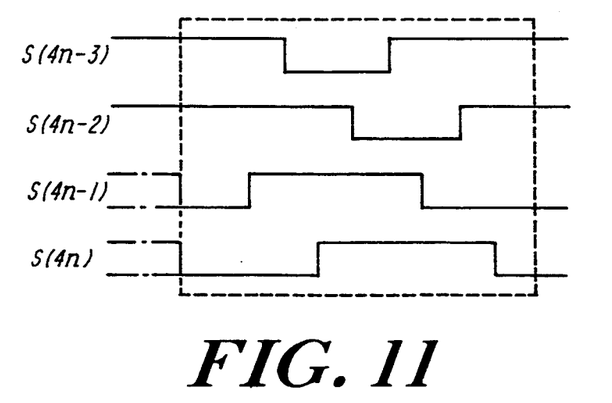
FIG. 11 shows four-phase pulse signals used for the solid-state imaging device according to the present invention.

FIG. 10 shows waveforms of the pulse signals $\phi_{V1}$ to $\phi_{V4}$, $\phi_G$, $\phi_T$, and $\phi_{ST}$, and the clock signal $\phi_{CK}$, where an omitted portion by vertical wave lines corresponds to an effective horizontal scanning period and a portion between the omitted portions corresponds to a horizontal blanking period. In FIG. 10, portions of the waveforms of the pulse signals $\phi_{V1}$ to $\phi_{V4}$ enclosed by broken lines are omitted for convenience. FIG. 11 represents these omitted portions and shows four-phase pulse signals. In FIG. 11, n is an integer. When n=1, for example, the driving signal S(1) has the waveform shown at the top of FIG. 11, and the driving signal S(2) has the waveform shown second from the top thereof.

Figure 12:
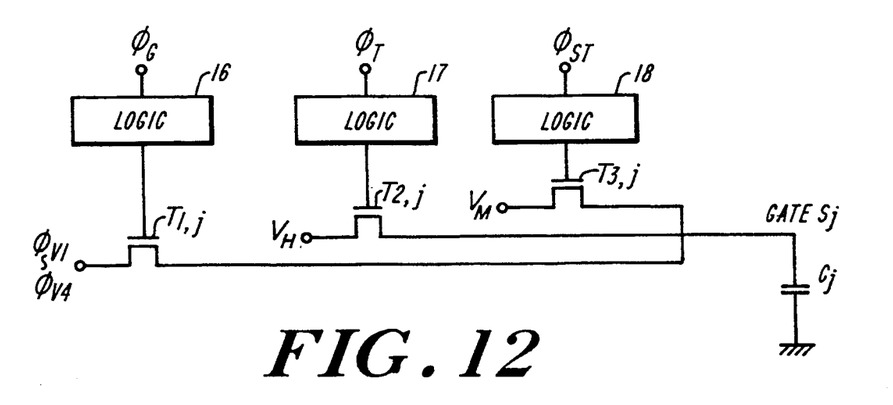
FIG. 12 is a circuit configuration for an electrode of the vertical charge transfer portion according to the present invention.

FIG. 12 shows a circuit configuration only for a single j-th electrode (hereinafter, referred to as a gate $S_j$) of the vertical charge transfer portion 2, for easier understanding of the operation of the scanners. The pulse signals $\phi_G$, $\phi_T$, and $\phi_{ST}$ are supplied to corresponding switching elements disposed in the scanners through logic portions of the scanners. When the pulse signals $\phi_G$, $\phi_T$, and $\phi_{ST}$ are at a high level, the corresponding switching elements are in an on-state, allowing the pulse signals $\phi_{V1}$ to $\phi_{V4}$, and the voltage signals $V_H$ and $V_M$ to be applied to the gate $S_j$. When the pulse signals $\phi_G$, $\phi_T$, and $\phi_{ST}$ are in a low level, the corresponding switching elements are in an off-state, allowing the previous DC level attained immediately before the switching to be maintained since the gate $S_j$ itself has a capacitance $C_j$.

The scanners 13, 14, and 15 includes logic portions 16, 17, and 18, respectively. The structure of each logic portion is different according to a value of k corresponding to the k bit signal. The structure of each logic portion is described below in a case where k=2. The logic portion 16 of the scanner 13 supplies the pulse signal $\phi_G$ to a switching element $T_{1,j}$ which satisfies the relationship of $1 \leq j \leq 4m+4$, wherein m is an integer representing the period number of the clock signal $\phi_{CK}$ counted from the start of one field. The switching element $T_{1,j}$ is a j-th switching element disposed in the scanner 13 and connected to the gate $S_j$. The logic portion 17 of the scanner 14 supplies the pulse signal $\phi_T$ to a switching element $T_{2,j}$ which satisfies the relationship of j=4m−3 or j=4m−1. The switching element $T_{2,j}$ is a j-th switching element disposed in the scanner 14 and connected to the gate $S_j$. The logic portion 18 of the scanner 15 supplies the pulse signal $\phi_{ST}$ to a switching element $T_{3,j}$ which satisfies the relationship of $4m-3 \leq j \leq 4m+4$. The switching element $T_{3,j}$ is a j-th switching element disposed in the scanner 15 and connected to the gate $S_j$.

Figure 13:
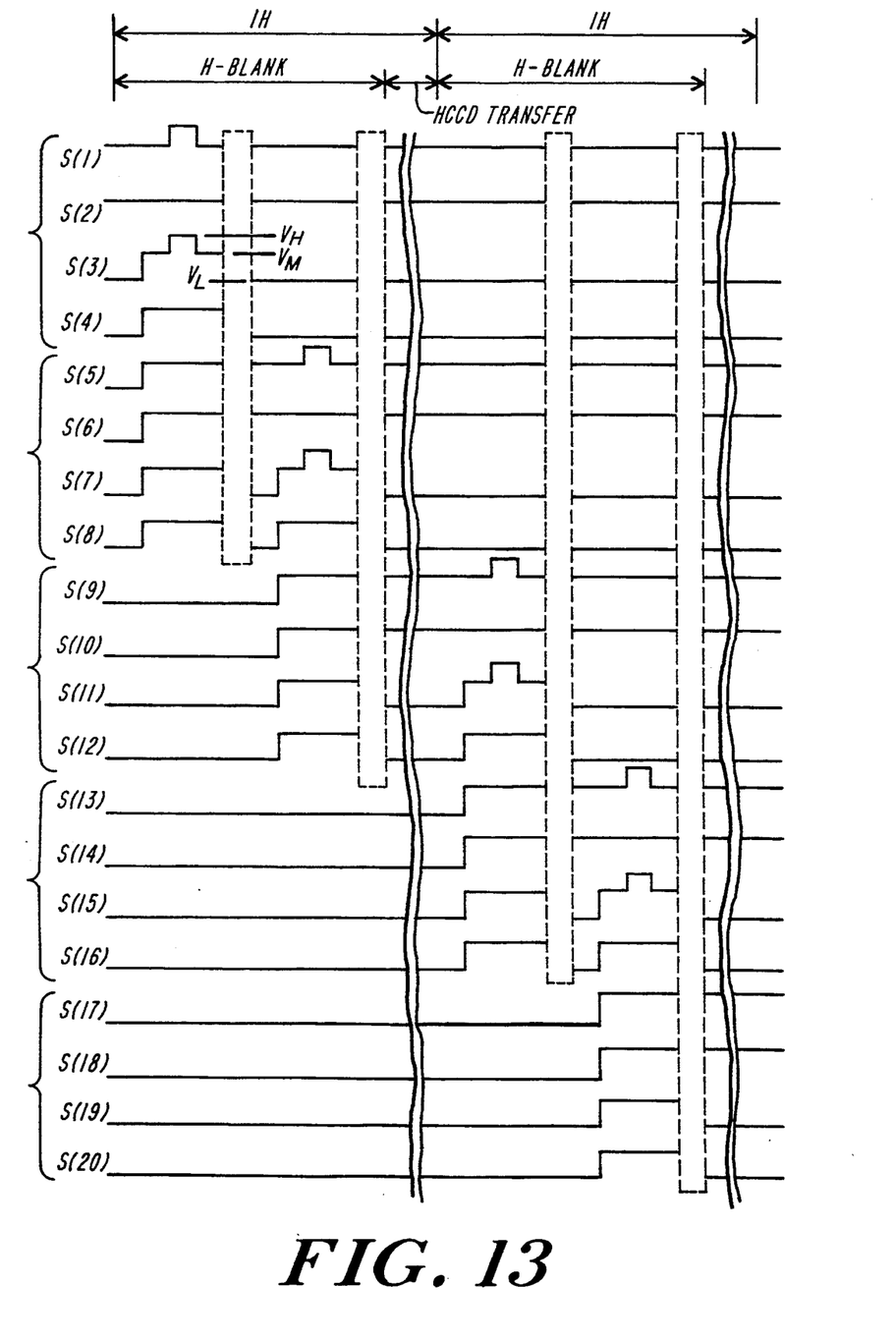
FIG. 13 shows waveforms of driving signals generated by the driving circuit of the solid-state imaging device according to the present invention.

FIG. 13 shows waveforms of the driving signals S(1), S(2), S(3), . . . generated by the driving circuit 5 in a manner described above. In FIG. 13, portions of the waveforms enclosed by broken lines are omitted for convenience. FIG. 11 representatively shows these omitted portions. By applying driving signals having the waveforms shown in FIG. 13 to the electrodes of the vertical charge transfer portion 2, the signal read and transfer operation substantially equivalent to that shown in FIGS. 1 and 2 can be realized.

EXAMPLE 2

Figure 4:
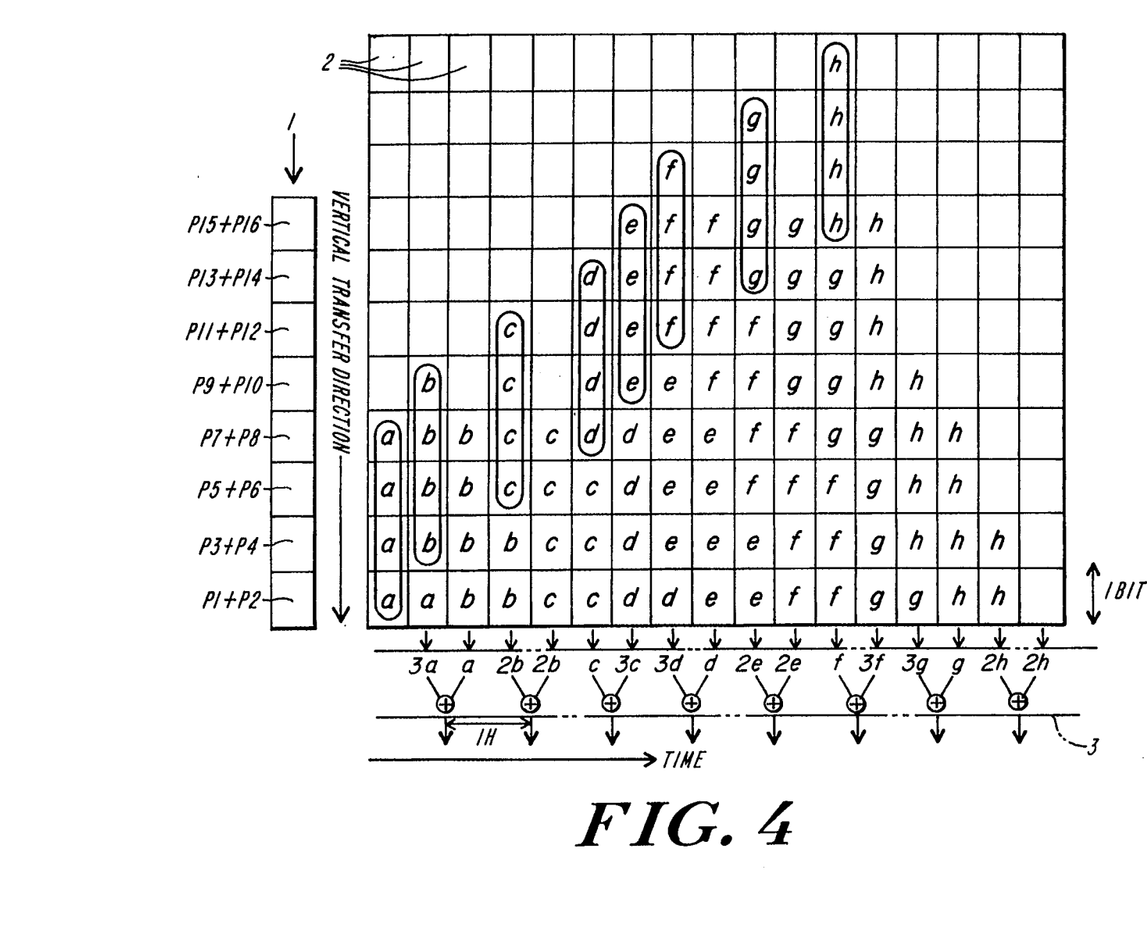
FIG. 4 is a schematic view illustrating the read and transfer operation carried out by another solid-state imaging device according to the present invention.

FIG. 4 schematically illustrates another signal read and transfer operation used for a second example of the solid-state imaging device according to the present invention. The left part of FIG. 4 shows pairs of pixels P1 and P2, P3 and P4, . . . , P15 and P16 in one column of pixels 1, which respectively output packet signals 4a, 4b, . . . , 4h. Instead of reading signals from each pair of the pixels as one packet signal, it is possible to read a signal from each pixel individually as one packet signal. The right part of FIG. 4 shows an arrangement of the packet signals 4a, 4b, . . . , 4h in one vertical charge transfer portion 2, in the time sequence.

Referring to FIG. 4, how the signals are read as one packet signal into the vertical charge transfer portion 2, and how the read signals are transferred to the horizontal charge transfer portion 3 will be described in detail below. Signals a1 and a2 in the pair of pixels P1 and P2 are first read into the vertical charge transfer portion 2. Then, the signals a1 and a2 are added to each other over four bits portions of the vertical charge transfer portion 2 to obtain a signal a1+a2 (i.e., 4a). Then, the signal a1+a2 is split into four (a1+a2)/4 (i.e., a) signals. Specifically, a first packet signal 4a is read from a first pixel unit, for example, a pair of pixels P1 and P2, and is put into four bits portions of the vertical charge transfer portion 2. As a result, signals (a,a,a,a) are formed in four bit portions of the vertical charge transfer portion 2.

Then, the signals (a,a,a,a) present in the vertical charge transfer portion 2 are shifted in the vertical direction by three bits, so that the signals 3a corresponding to three bits of the vertical charge transfer portion 2 are transferred to a horizontal charge transfer portion 3. Thereafter, a second packet signal 4b is read from a second pixel unit, for example, a pair of pixels P3 and P4 and is put into other four bit portions of the vertical charge transfer portion 2. As a result, signals (b,b,b,b) are newly formed in the four bit portions of the vertical charge transfer portion 2 when the signal a corresponding to one bit of the vertical charge transfer portion 2 remains in the vertical charge transfer portion 2. The four bit portions of the second packet signal are shifted to a farther position from the horizontal charge transfer portion 3 in the vertical direction by one bit portion from the four bit portions of the first packet signal.

Thereafter, all the signals present in the vertical charge transfer portion 2 are shifted in the vertical direction by one bit, so that the remaining one bit signal a is transferred into the horizontal charge transfer portion 3. Thus, the signals (a,a,a,a) are separately transferred to the horizontal charge transfer portion 3; three bits in the first transfer and one bit in the second transfer. The previously-transferred three bits and the newly-transferred one bit are then added to each other in the horizontal charge transfer portion 3 so as to obtain a signal (3a+a). The process for obtaining the signal (3a+a) is carried out during one horizontal blanking period.

Then, the first signal (3a+a) is transferred in the horizontal direction by the horizontal charge transfer portion 3 during the horizontal transfer period at high speed to reach the output portion 4, where it is converted into an image signal.

Next, the signals (b,b,b,b) present in the vertical charge transfer portion 2 are shifted in the vertical direction by two bits, so that the signals 2b are transferred to a horizontal charge transfer portion 3. Thereafter, a third packet signal 4c is read from a third pixel unit, for example, a pair of pixels P5 and P6, and is put into another four bit portions of the vertical charge transfer portion 2. As a result, signals (c,c,c,c) are nearly formed in the four bit portions of the vertical charge transfer portion 2 when the signals 2b corresponding to two bits of the vertical charge transfer portion 2 remain in the vertical charge transfer portion 2.

Thereafter, all the signals present in the vertical charge transfer portion 2 are shifted in the vertical direction by two bits, so that the remaining signals 2b are transferred into the horizontal charge transfer portion 3. Thus, the signals (b,b,b,b) are separately transferred into the horizontal charge transfer-portion 3; two bits in the first transfer and two bits in the second transfer. The previously-transferred two bits and the newly-transferred two bits are then added to each other in the horizontal charge transfer portion 3 so as to obtain e signal (2b+2b). The process for obtaining the signal (2b+2b) is carried out during one horizontal blanking period.

Then, the second signal (2b+2b) is transferred in the horizontal direction by the horizontal charge transfer portion 3 during the horizontal transfer period at high speed to reach the output portion 4, where it is converted into an image signal.

Next, the signals (c,c,c,c) present in the vertical charge transfer portion 2 are shifted in the vertical direction by one bit, so that the signal c is transferred to a horizontal charge transfer portion 3. Thereafter, a fourth packet signal d is read from a fourth pixel unit, for example, a pair of pixels P7 and P8, and is put into other four bit portions of the vertical charge transfer portion 2. As a result, signals (d,d,d,d) are newly formed in the four bit portions of the vertical charge transfer portion 2 when the signals 3c corresponding to three bits of the vertical charge transfer portion 2 remain in the vertical charge transfer portion 2.

Thereafter, all the signals present in the vertical charge transfer portion 2 are shifted in the vertical direction by three bits, so that the remaining three bit signals 3c are transferred into the horizontal charge transfer portion 3. Thus, the signals (c,c,c,c) are separately transferred into the horizontal charge transfer portion 3; one bit in the first transfer and three bits in the second transfer. The previously-transferred one bit and the newly-transferred three bits are then added to each other in the horizontal charge transfer portion 3 so as to obtain a pixel signal (c+3c). The process for obtaining the signal (c+3c) is carried out during one horizontal blanking period.

Then, the third signal (c+3c) is transferred in the horizontal direction by the horizontal charge transfer portion 3 during th horizontal transfer period at high speed to the output portion 4, where it is converted into an image signal.

A fifth packet signal 4e is read from a fifth pixel unit, for example, a pair of pixels P9 and P10, and is put into other four bit portions of the vertical charge transfer portion 2. As a result, signals (e,e,e,e) are newly formed in the four bit portions of the vertical charge transfer portion 2 when the signals (d,d,d,d) remain in the vertical charge transfer portion 2.

Thereafter, all the signals present in the vertical charge transfer portion 2 are shifted in the vertical direction by three bits, so that the signals 3d corresponding to three bits of the vertical charge transfer portion 2 are transferred into the horizontal charge transfer portion 3.

Then, a sixth packet signal 4f is read from a sixth pixel unit, for example, a pair of pixels P11 and P12, and is put into other four bit portions of the vertical charge transfer portion 2. As a result, signals (f,f,f,f) are newly formed in the four bit portions of the vertical charge transfer portion 2 when the signal d corresponding to one bit of the vertical charge transfer portion 2 and the signals (e,e,e,e) remain in the vertical charge transfer portion 2.

Thereafter, all the signals present in the vertical charge transfer portion 2 are shifted in the vertical direction by one bit, so that the remaining signal d is transferred into the horizontal charge transfer portion 3. The previously-transferred three bits 3d and the newly-transferred one bit d are then added to each other in the horizontal charge transfer portion 3 so as to obtain a signal (3d+d). The process for obtaining the signal (3d+d) is carried out during one horizontal blanking period.

Then, the fourth signal (3d+d) is transferred in the horizontal direction by the horizontal charge transfer portion 3 during the horizontal transfer period at high speed to reach the output portion 4, where it is converted into an image signal.

The above-described signal read and transfer operation is repeated until an eighth packet signal 4h is read from an eight pixel unit, for example, a pair of pixels P15 and P16 which are located farthest from the horizontal charge transfer portion 3, and is put into other four bit portions of the vertical charge transfer portion 2. By this time, the signals (e,e,e,e) have been transferred into the horizontal charge transfer portion 3 separately, two bits in the first transfer and two bits in the second transfer.

Thereafter, only the signal transfer operation is carried out in the vertical charge transfer portion 2. The signals (f,f,f,f), (g,g,g,g), and (h,h,h,h) read over the four bit portions of the vertical charge transfer portion 2 are respectively transferred into the horizontal charge transfer portion 3 separately; one bit and three bits for the signals (f,f,f,f), three bits and one bit for the signals (g,g,g,g), and two bits and two bits for the signal (h,h,h,h). These separately-transferred signals are then added to each other in the horizontal charge transfer portion 3 so as to obtain signals (f+3f), (3g+g), and (2h+2h), respectively. These signals are then transferred to the output portion 4.

When the signal read and transfer operation for the first field is completed, the signal read and transfer operation for the second field of the same column of pixels immediately starts in the same manner as that described above.

According to the solid-state imaging device of this example, one packet signal is read over the four bit portions of the vertical charge transfer portion 2. Therefore, the maximum charge handling capacity of the vertical charge transfer portion can be quadrupled. Also, as in Example 1, the vertical charge transfer portion 2 can be effectively used, and troubles of increased power consumption and noise generation in output signals can be prevented.

In the above examples, each packet signal is read over the two bit or four bit portions of the vertical charge transfer portion. However, the structure of the solid-state imaging device according to the present invention is not limited to the structure mentioned above. When the number of pixels lined up in one column is m, the packet signal can be read over k bit portions of the vertical charge transfer portion wherein k is an integer equal to or more than 2 but smaller than m. With this structure, the maximum charge handling capacity of the vertical charge transfer portion can be increased by k times, as well as the method described in the above examples.

Furthermore, according to the present invention, the vertical charge transfer portion reads a signal as one packet signal from pixel(s) and puts the signal into k bit portions of the vertical transfer portion. The signal corresponding to the k bit portions is referred to as a k bit signal. After a (k−1) bit signal of the k bit signal is transferred, a next packet signal from pixel(s) is read and put into another k bit portions of the vertical charge transfer portion. The k bit portions of the next packet signal are shifted to a farther position from the horizontal charge transfer portion in the vertical direction by one bit portion from the k bit portions of the previous packet signal. Therefore, the signal read into the vertical charge transfer portion are always lined up in the vertical charge transfer portion without posing any inbetween blank bit portion. This allows an efficient use of the vertical charge transfer portion. In the vertical charge transfer portion, the signal transfer operation is carried out only during the horizontal blanking periods. Therefore, driving signals can be applied to electrodes of the vertical charge transfer portion only during the horizontal blanking periods. Thus, troubles of increased power consumption and noise generation in output signals can be prevented.

As in Example 1, the signal read and transfer operation shown in FIG. 4 can be conducted by a driving circuit having a circuit configuration similar to that shown in FIG. 9.

In the above examples, the vertical charge transfer portion is disposed on the right side of each column of pixels. However, the read and transfer operation described above is also applicable to a solid-state imaging device where the vertical charge transfer portion is disposed on the left side of each column of pixels.

Further, in the above examples, a single horizontal charge transfer portion is provided. However, the read and transfer operation described above is also applicable to a solid-state imaging device having a plurality of horizontal charge transfer portions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for driving a solid-state imaging device including:
   a pixel portion including n pixels (i=1 to n) arranged in a first direction, said pixels converting light into electric charge and accumulating electric charge;
   first charge transfer means coupled to said pixel portion, for transferring a signal read from each of the pixels arranged in said pixel portion in said first direction;
   second charge transfer means coupled to one end of said first charge transfer means, for receiving the signal transferred by said first charge transfer means and for transferring the received signal in a second direction; and
   output means coupled to one end of said second charge transfer means for receiving the signal transferred by said second charge transfer means and for converting the received signal into an image signal to output to an external device,
   wherein said n pixels include a first pixel (i=1) to an n-th pixel (i=n), said first pixel being arranged nearest to said second charge transfer means, said n-th pixel being arranged farthest from said second charge transfer means, and
   wherein said first charge transfer means includes a first bit portion (i=1) to an n-th bit portion (i=n), said first bit portion being arranged nearest to said second charge transfer means, said n-th bit portion being arranged farthest from said second charge transfer means,
   said method comprising the steps of:
   (1) reading a signal from said first pixel (i=1) of said n pixels arranged in said pixel portion into said first charge transfer means over k bit portions thereof starting from said first bit portion (i=1) thereof;
   (2) transferring the read signal corresponding to k bits of said first charge transfer means in said first direction during one horizontal blanking period;
   (3) reading a signal from an (i+1)-th pixel of said n pixels arranged in said pixel portion into said first charge transfer means over k bit portions thereof starting from an (i+1)-th bit portion thereof after shifting the read signal corresponding to the k bits of said first charge transfer means towards said second charge transfer means by (k−1) bits;
   (4) repeating said steps (2) through (3) for i=1 to i=n−1; and
   (5) repeating said step (2) after said n-th pixel farthest from said second charge transfer means has been read.

2. A method for driving a solid-state imaging device according to claim 1, wherein said transferring step (2) includes the steps of splitting said signal corresponding to the k bits of said first charge transfer means into first signal portions corresponding to (k−m) bits and second signal portions corresponding to m bits, and transferring said first signal portions and said second signal portions in said first direction during one horizontal blanking period, where m is an integer satisfying $1 \leq m < k$.

3. A method for driving a solid-state imaging device according to claim 1, wherein said first pixel has a first pixel portion and a second pixel portion, and said signal is a sum of a signal from said first pixel portion and a signal from said second pixel portion.

4. A solid-state imaging device comprising:

a pixel portion including n pixels (i=1 to n) arranged in a first direction, said pixels converting light into electric charge and accumulating electric charge;

first charge transfer means coupled to said pixel portion, for transferring a signal read from each of the pixels arranged in said pixel portion in said first direction;

second charge transfer means coupled to one end of said first charge transfer means, for receiving the signal transferred by said first charge transfer means and for transferring the received signal in a second direction;

output means coupled to one end of said second charge transfer means for receiving the signal transferred by said second charge transfer means and for converting the received signal into an image signal to output to an external device; and driving means for driving said first charge transfer means, wherein said n pixels include a first pixel (i=1) to an n-th pixel (i=n), said first pixel being arranged nearest to said second charge transfer means, said n-th pixel being arranged farthest from said second charge transfer means, wherein said first charge transfer means includes a first bit portion (i=1) to an n-th bit portion (i=n), said first bit portion being arranged nearest to said second charge transfer means, said n-th bit portion being arranged farthest from said second charge transfer means, and wherein said driving means generates a plurality of driving signals for:

(1) reading a signal from said first pixel (i=1) of said n pixels arranged in said pixel portion into said first charge transfer means over k bit portions thereof starting from said first bit portion (i=1) thereof;

(2) transferring the read signal corresponding to k bits of said first charge transfer means in said first direction during one horizontal blanking period;

(3) reading a signal from an (i+1)-th pixel of said n pixels arranged in said pixel portion into said first charge transfer means over k bit portions thereof starting from an (i+1)-th bit portion thereof after shifting said read signal corresponding to the k bits of said first charge transfer means towards said second charge transfer means by (k−1) bits;

(4) repeating said steps through (3) for i=1 to i=n−1; and (5) repeating said step (2) after said n-th pixel farthest from said second charge transfer means has been read.

5. A solid-state imaging device according to claim 4, wherein said signal corresponding to k bits of said first charge transfer means in said step (2) is split into first signal portions corresponding to (k−m) bits and second signal portions corresponding to m bits, and said first signal portions and said second signal portions are transferred in said first direction during one horizontal blanking period, where m is and integer satisfying $1 \leq m < k$.

6. A solid-state imaging device according to claim 4, wherein each of said pixels has a first pixel portion and a second pixel portion, and said signal is a sum of a signal from said first pixel portion and a signal from said second pixel portion.

* * * * *